Feb. 13, 1945. G. F. RACKETT 2,369,176
CINEMATOGRAPHIC FILM REGISTRATION
Filed April 24, 1942
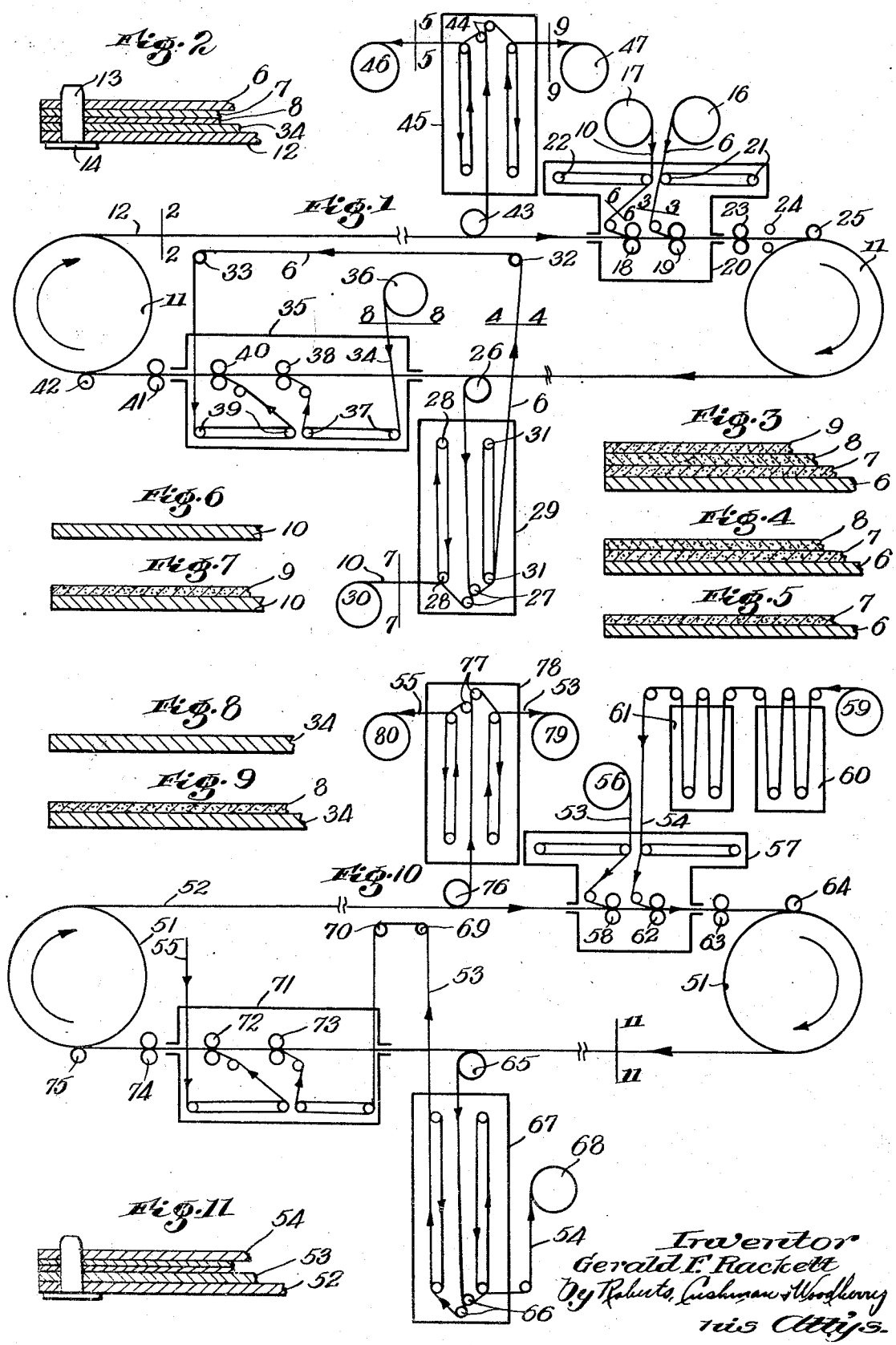

Patented Feb. 13, 1945

2,369,176

UNITED STATES PATENT OFFICE 2,369,176

CINEMATOGRAPHIC FILM REGISTRATION

Gerald F. Rackett, Los Angeles, Calif., assignor to Technicolor Motion Picture Corporation, Hollywood, Calif., a corporation of Maine Application April 24, 1942, Serial No. 440,324

9 Claims. (Cl. 101—149.1)

In various processes of color cinematography it is necessary to register a plurality of color-separation films with a single composite film. Thus in the imbibition process a blank film is successively printed with color-separation matrices to form a composite film; and, in the case of a multi-layer composite film having the differently sensitized layers joined together with transparent adhesive, after the film has been exposed and developed it has been proposed to transfer the layers to separate bases respectively to form color-separation films, the transfer involving the successive registration of the separate bases with the composite film preparatory to peeling off the layers.

The best way of effecting the aforesaid registration consists in bringing the films together on an endless belt or other carrier having teeth which fit the sprocket holes of the films and travel in an orbital path. However it has been found that, notwithstanding the utmost care in making the carrier, the position of the teeth on the carrier varies slightly throughout the length of the carrier, thereby giving rise to registration errors. In imbibition printing the error consists in that the superposed prints from the color-separation matrices upon the composite film do not register exactly, thereby causing color fringes and imperfect definition. In transferring picture layers from a composite multi-layer film to form color-separation films, the error consists in that corresponding pictures on the color-separation films do not bear the same relation to their adjacent sprocket holes; consequently in using the color-separation films to produce composite prints, by imbibition or otherwise, the superposed prints do not register exactly.

Objects of the present invention are to overcome the aforesaid registration difficulty and to obtain perfect registration notwithstanding the inevitable non-uniformity in successive teeth throughout the length of a register belt or other carrier having an endless series of register teeth.

In one aspect the present invention involves a method of successively registering a plurality of films having corresponding record sequences on an endless belt or other carrier traveling in an orbial path and having a succession of register teeth engaging the sprocket holes of the films, the method consisting in feeding the films on the carrier so that the same teeth engage the holes of the different films corresponding to the same records of the sequences respectively, whereby non-uniformity in successive teeth has corresponding effect in the registration of the different films. In a more specific aspect the method involves successively feeding color-separation films into contact with a composite film on the aforesaid registered teeth so that corresponding sprocket holes of the different films engage the same teeth. In a still more specific aspect the method involves feeding the color-separation films into contact with the composite film at successive locations along the path of the teeth on the carrier, but with the same teeth engaging the sprocket holes of the different color-separation films as aforesaid. In transferring the different layers of a multi-layer composite film to other bases to form color-separation films, the bases are fed to the carrier at the successive locations, preferably between the carrier and the composite film; and in the case of imbibition printing the matrices are fed to the carrier at the successive locations, preferably with the composite film between the carrier and the matrices respectively. While the composite film may continue with the carrier past the aforesaid locations, preferably the composite film is fed from the carrier with each color-separation film and then returned to the carrier with the next color-separation film. In transferring the layers of a multi-layer film, the layer to be removed is preferably loosened somewhat before the composite film is fed to the carrier, the loosening being sufficient to permit the layer to be peeled from the composite film, but not sufficient to permit it to shift edgewise of the film. If the preliminary treatment to which the composite film is subjected before it feeds to the carrier substantially affects the film upon which the picture layers are supported, the bases of the color-separation films are preferably subjected to the same treatment so that they will be similarly affected. For example if the preliminary treatment is a liquid treatment which causes the films to expand, both the composite film and the color-separation films should be subjected to the same treatment so that they expand equally.

In another aspect the invention involves apparatus comprising an endless belt or other carrier having a succession of register teeth engaging in the sprocket holes of the films, together with means for successively feeding the color-separation films into contact with the composite film on the register teeth so that corresponding sprocket holes of the different films engage the same teeth, whereby non-uniformity in the teeth throughout the length of the carrier has corresponding effect in the registration of the different color-separation films with the composite film. In a more specific aspect, the means for feeding the color-separation films to the carrier are distributed at spaced locations along the orbital path of the carrier.

For the purpose of illustration typical embodiments of the invention are illustrated in the accompanying drawing in which Fig. 1 is a diagrammatic view of stripping apparatus for transferring the picture layers of a composite film to separate bases to form color-separation films;

Figs. 2 to 9 inclusive are sections on lines 2 to 9 of Fig. 1, parts being broken away;

Fig. 10 is a diagrammatic view of imbibition printing apparatus; and

Fig. 11 is a section on line 11—11 of Fig. 10.

One type of composite film suitable for use on the stripping machine of Fig. 1 is illustrated in Fig. 3. This type comprises an ordinary base 6 with three layers of emulsion 7, 8 and 9, the layer 7 being permanently mounted on the base in the usual way, the layer 8 being mounted on the layer 7 with an alcohol-soluble adhesive and the layer 9 being mounted on the layer 8 with a water-soluble adhesive. In this way the layer 9 may be loosened with water without loosening the layer 8 and the layer 8 may be subsequently removed without loosening the layer 7. However it will be understood that the present invention, at least in its broader aspects, is independent of the particular construction of the composite film. As shown in Fig. 6 the separate base material 10 to which the layers of emulsion are to be transferred may comprise ordinary cinematographic film base.

The particular embodiment of the invention chosen for the purpose of illustration in Figs. 1 to 9 comprises two drums or sheaves 11 over which is trained an endless belt 12 along the margins of which are mounted rows of register pins or teeth 13 adapted to fit into the sprocket holes of the films. While the pins may be mounted on the belt in various ways, they are preferably fitted into perforations in the belt corresponding to the perforations in the films with heads 14 seating against the back of the belt. Preferably both the belt and the pins are formed of metal and the heads 14 are soldered to the back of the belt.

As shown in Fig. 1 the composite film 6 is fed into the machine from a reel 16 and the uncoated base material 10 is fed from a reel 17, the film 10 being fed to the belt between a pair of rollers 18 which seat the film firmly on the belt with the teeth 13 projecting through the sprocket holes of the film, and the composite film 6 being fed to the belt between a similar pair of seating rolls 19 in superposed relation to the film 10. In transit to the belt the composite film feeds through a water tank 20 to soften the adhesive between the layers 8 and 9, the film zigzagging back and forth over opposed pairs of guide rolls 21 to afford time for the water to soften the adhesive somewhat but not sufficiently for the layer to become displaced before the composite film is seated on the belt. Inasmuch as the film may be expanded slightly by the water, the base 10 is subjected to similar treatment by zigzagging back and forth over similar sets of rollers 22 so that the two films are equally affected. The belt enters and leaves the water tank through narrow slits which permit only a small amount of leakage, this leakage being continuously replaced by suitable supply means. After the belt emerges from the tank the films are again pressed together and against the belt by means of another pair of seating rolls 23. As the belt starts around the sheave 11 another roller 25 presses the film snugly against the belt. In the curved portion of the path of the belt, throughout approximately 180° of the periphery of the drum, the pins on the belt separate fanwise to force the films more tightly together. After the films are thus subjected to the liquid treatment and then pressed together on the belt they travel with the belt a sufficient distance for the top layer 9 to adhere more firmly to the new base 10 than to the underlying layer 8, the layer 9 adhering to the new base by virtue of the tacky nature of the gelatin or other material constituted in the layer as a result of the previous water treatment. Thus as the films travel together on the belt they are held in exact registration by the pins on the belt while the layer 9 is transferred from the composite film to the base 10.

After the layer 9 has become firmly attached to the new base both films are fed from the belt over a roller 26 between a pair of rollers 27 where the two films are peeled apart, the composite film 6 with its remaining layers 7 and 8 (Fig. 4) feeding to the right and the base 10 with the layer 9 (Fig. 7) feeding to the left. The film 10 loops back and forth over pairs of guide rolls 28 in a drying compartment 29 until the film is dry and then it feeds out to a take-up roll 30. The composite film 6 loops back and forth over pairs of guide rolls 31 in the drying compartment and then feeds over guide rolls 32 and 33 to a second station where it is fed back to the belt in superposed relationship to a new base 34 (Fig. 8) to which the layer 8 is to be transferred.

At the second station a tank 35, corresponding to tank 20 at the first station, is arranged to wet both films in like manner. If the layer is joined to the layer 7 by means of an alcohol-soluble adhesive, the tank 35 contains alcohol. The blank film 34 feeds into the tank from a feed roll 36, then loops back and forth over pairs of guide rolls 37 and then feeds to the belt between a pair of seating rolls 38. The composite film 6 loops back and forth over pairs of guide rolls 39 and then feeds to the belt in superposed relation to the base 34 between a pair of seating rolls 40. After the belt emerges from the tank 35 it passes between another pair of pressure rolls 41 and thence under a pressure roll 42, thence around the left-hand drum 11 and thence throughout a stretch sufficiently long to permit the layer 8 to become firmly attached to the new base 34, whereupon the two films feed from the belt over the guide roll 43 to a pair of guide rolls 44 where the two films are peeled apart. The composite film 6, with only layer 7 remaining thereon (Fig. 5), feeds to the left through the drying compartment 45 and thence to take-up reel 46 and the base 34, with the layer 8 adhering thereto (Fig. 9), feeds to the right through the drying compartment and thence to the take-up roll 47. Thus the composite film of Fig. 3 is converted into the three color-separation films shown in Figs. 5, 7 and 9.

The imbibition printing apparatus shown in Figs. 10 and 11 comprises two drums or sheaves 51 with a pin belt 52, like belt 12 in Fig. 1, trained thereover. The blank film 53, to be printed by imbibition from matrices 54 and 55, is fed from the reel 56 through a water tank 57 and thence to the belt 52 between seating rolls 58. The matrix 54 is fed from a reel 59 through a tank 60 containing dye of the appropriate color, thence through a wash tank 61 to wash off the dye superficially adhering to the surface of the film, thence through the water tank 57 and thence to the belt 52 between the seating rolls 62. The coated face of the blank 53 is directed away from the belt and the printing side of the matrix 54 is directed toward the belt, so that the two films are pressed into face-to-face contact by the seating rolls 62. After the films emerge from the tank 57 they are again pressed together by a pair of pressure rolls 63 and a single pressure roll 64. After the two films have travelled in contact for a sufficient distance for the dye to be imbibed from the matrix to the blank, both films are fed off the belt over a guide roller 65 and thence between a pair of rolls 66 where the two films are peeled apart. The matrix 54 then loops back and forth over pairs of opposed guide rolls in the drying compartment 67 and thence passes to the take-up roll 69. After looping back and forth between pairs of opposed guide rolls in the drying compartment the blank 53 feeds over guide rolls 69 into another water tank 71 where it is again conditioned to receive an imbibition print before it returns to the belt between the seating rolls 72. After passing through dye and wash tanks corresponding to 60 and 61, the second matrix 55 feeds through the tank 71 to the belt 52 between seating rolls 73. After the films emerge from the tank 71 they are again pressed together by the seating rolls 74 and the pressure roll 75. After continuing in contact with each other throughout a length of the belt path sufficient to affect the dye transfer, the two films are fed from the belt over a roll 76 to a pair of rolls 77 where the two films are peeled apart, the printed film 53 passing through the drying compartment 78 to the take-up reel 79 and the matrix 55 passing through the drying compartment to a take-up reel 80.

Thus the composite film 53 is printed with two series of pictures of complementary colors from the color-separation matrices 54 and 55. Instead of only two series of pictures, three series of different colors may be printed, in which case the belt may be trained over two pairs of sheaves in the form of a double loop as in the Kienninger Patent 1,803,115 or three sheaves may be located at three corners of a triangle so that in passing from sheave to sheave the belt would successively pass along the three sides of the triangle, a color-separation film being fed to the belt along each of the three sides of the triangle.

Various details of construction of parts of the apparatus diagrammatically represented in Figs. 1 to 10 are disclosed in the prior patents, 1,675,743, 1,704,328, 1,707,695, 1,707,699, 1,707,710, 1,707,733, 1,928,714, 2,257,254 and 2,271,572.

According to this invention the color-separation films are fed into contact with the composite film on the aforesaid belt so that corresponding sprocket holes of the different films engage the same teeth of the belt. Thus in Fig. 1 the teeth which engage the sprocket holes of the composite film 6 adjacent each picture also engage the sprocket holes of both of the color-separation films 10 and 34 adjacent corresponding scenes. For example the films 6 and 34 are fed to the belt at the seating rolls 40 so that the teeth which engage the sprocket holes of the two films adjacent the first picture are the same teeth which engaged the films 6 and 10 at the seating rolls 19 adjacent the first picture of the first scene on the film 6; and of course the same is true of each succeeding picture of the entire series.

Likewise in the imbibition printing method illustrated in Fig. 10 the matrices are fed to the belt so that the teeth which engage the sprocket holes of the first matrix adjacent the first picture are the same teeth which engage the sprocket holes of each succeeding matrix adjacent the first picture.

One way of identifying the different pins is to apply numbers to the belt, as for example a number adjacent each pin or a number associated with each group of pins corresponding to the length of one picture space. However in practice it is usually sufficient merely to mark one pin or one pair of pins, as for example by giving this pin or pair of pins a distinctive color, in which case each of the films may be fed to the belt so that this particular pin or pair of pins is opposite the first picture of each film. If desired the splice where the two ends of the belt are joined together may be used as the marker.

In the case of the integral pack negatives the different color-aspect records in the respective layers should usually be developed differently. For example, it may be desirable to use different developers or different times of development or both. According to the present invention this can readily be done by developing the respective layers after they have been transferred to their new bases.

It should be understood that the present disclosure is for the purpose of illustration only and that this invention includes all modifications and equivalents which fall within the scope of the appended claims.

I claim:

1. In the art of color cinematography the method of successively registering color-separation films with a composite film on a carrier having a succession of register teeth engaging the sprocket holes of the films, characterized by successively feeding the color-separation films into contact with the composite film on the register teeth with the same teeth engaging the holes of the different films corresponding to the same records of the sequences respectively, whereby non-uniformity in the teeth throughout the length of the carrier has corresponding effect in the registration of the different color-separation films with the composite film.

2. In the art of registering color-separation films with a composite film on an endless belt traveling in an orbital path and having a succession of registered teeth engaging the sprocket holes of the films, the method which comprises successively feeding the color-separation films into contact with the composite film on the belt with the same teeth engaging the holes of the different color-separation films corresponding to the same records of the sequences respectively, whereby non-uniformity in successive teeth throughout the length of the belt has corresponding effect in the registration of the different films.

3. In the art of registering color-separation films with a composite film on an endless belt traveling in an orbital path and having a succession of registered teeth engaging the sprocket holes of the films, the method which comprises feeding the composite film to the belt, and feeding the color-separation films to the belt with the same teeth engaging the sprocket holes of the different color-separation films corresponding to the same records of the sequences respectively, the color-separation films being fed into contact with the composite film on the belt at successive locations along said path, and each color separation film leaving the belt in advance of the location where the next film is fed to the belt.

4. The method of forming multi-color cinematographic film by printing a dye-absorptive film with differently dyed color-separation matrices, which comprises successively bringing the matrices into contact with the film on a carrier which has a succession of register teeth engaging the sprocket holes of the film and matrices, characterized by successively feeding the matrices to the film with the same teeth engaging the holes of the different films corresponding to the same records of the sequences respectively, whereby non-uniformity in the teeth throughout the length of the carrier has corresponding effect in the different printing operations.

5. In the art of forming multi-color cinematographic film by printing a dye-absorptive film with differently dyed color-separation matrices on an endless belt traveling in an orbital path and having teeth engaging the sprocket holes of the film, the method which comprises successively feeding the color-separation matrices into contact with the dye-absorptive film on the belt with the same teeth engaging the holes of the different films corresponding to the same records of the sequences respectively, whereby non-uniformity in successive teeth throughout the length of the belt has corresponding effect in the registration of the different films.

6. In the art of forming multi-color motion picture film by printing a dye-absorptive film with differently dyed color-separation matrices on an endless belt traveling in an orbital path and having teeth engaging the sprocket holes of the film, the method which comprises successively feeding the color-separation matrices into contact with the dye-absorptive film on the belt at successive locations along said path, each color-separation film leaving the belt in advance of the location where the next film is fed to the belt, and the color-separation films being fed to the belt with the same teeth engaging the holes of the different films corresponding to the same records of the sequences respectively.

7. In the art of forming multi-colored cinematographic film by exposing the respective layers of a multi-layer film to different color aspects and transferring the outside layers to other bases to form a plurality of color-separation films, the method which comprises successively feeding the bases into contact with the multi-layer film on a carrier which has a succession of register teeth engaging the sprocket holes of the films, adhesively joining the bases to the layers respectively and then stripping off the layers with the bases, the bases being fed to the carrier with the same teeth engaging the holes of the different films corresponding to the same records of the sequences respectively, whereby corresponding pictures of the different color-separation films bear substantially the same relation to their adjacent sprocket holes notwithstanding non-uniformity in the teeth throughout the length of the carrier.

8. In the art of forming multi-colored cinematographic film by exposing the respective layers of a multi-layer film to different color aspects and transferring the outside layers to other bases to form a plurality of color-separation films, the method which comprises successively feeding the bases into contact with the multi-layer film on an endless belt traveling in an orbital path and having a succession of register teeth engaging the sprocket holes of the films, adhesively joining the bases to the layers respectively and stripping off the layers with the bases, the bases being fed to the belt with the same teeth engaging the holes of the different films corresponding to the same records of the sequences respectively, whereby corresponding pictures of the different color-separation films bear substantially the same relation to their adjacent sprocket holes notwithstanding non-uniformity in the teeth throughout the length of the belt.

9. In the art of forming multi-colored cinematographic film by exposing the respective layers of a multi-layer film to different color aspects and transferring the outside layers to other bases to form a plurality of color-separation films, the method which comprises successively feeding the bases into contact with the multi-layer film on an endless belt traveling in an orbital path and having a succession of register teeth engaging the sprocket holes of the films, adhesively joining the bases to the layers respectively and then stripping off the layers with the bases, the bases being fed to the belt at successive locations along said path with the same teeth engaging the holes of the different films corresponding to the same records of the sequences respectively, whereby corresponding pictures of the different color-separation films bear substantially the same relation to their adjacent sprocket holes notwithstanding non-uniformity in the teeth throughout the length of the belt.

GERALD F. RACKETT.